United States Patent
Li et al.

(10) Patent No.: US 10,259,025 B2
(45) Date of Patent: Apr. 16, 2019

(54) IRON-BASED BIOCHAR MATERIAL, PREPARATION THEREFOR AND USE THEREOF IN SOIL POLLUTION CONTROL

(71) Applicant: GUANGDONG INSTITUTE OF ECO-ENVIRONMENTAL SCIENCE & TECHNOLOGY, Guangzhou (CN)

(72) Inventors: Fangbai Li, Guangzhou (CN); Jianghu Cui, Guangzhou (CN); Chuanping Liu, Guangzhou (CN); Chengshuai Liu, Guangzhou (CN)

(73) Assignee: GUANGDONG INSTITUTE OF ECO-ENVIRONMENTAL SCIENCE & TECHNOLOGY, Guangzhou (CN)

( * ) Notice: Subject to any disclaimer, the term of this patent is extended or adjusted under 35 U.S.C. 154(b) by 0 days.

(21) Appl. No.: 15/518,180

(22) PCT Filed: Nov. 5, 2014

(86) PCT No.: PCT/CN2014/090307
§ 371 (c)(1),
(2) Date: Apr. 10, 2017

(87) PCT Pub. No.: WO2016/058228
PCT Pub. Date: Apr. 21, 2016

(65) Prior Publication Data
US 2017/0282229 A1    Oct. 5, 2017

(30) Foreign Application Priority Data
Oct. 13, 2014    (CN) .......................... 2014 1 0538633

(51) Int. Cl.
*B09C 1/00*    (2006.01)
*B09C 1/08*    (2006.01)
(Continued)

(52) U.S. Cl.
CPC .............. *B09C 1/08* (2013.01); *B01F 3/0815* (2013.01); *C01G 49/14* (2013.01); *C09K 17/40* (2013.01); *B01J 2220/485* (2013.01)

(58) Field of Classification Search
CPC ........................................................ B09C 1/00
See application file for complete search history.

(56) References Cited

U.S. PATENT DOCUMENTS

| 9,809,502 B2 * | 11/2017 | Bontchev | ................ C05D 9/00 |
| 2007/0022839 A1 * | 2/2007 | Chi | .......................... B22F 9/24 75/255 |
| 2013/0316898 A1 | 11/2013 | De Leij et al. | |

FOREIGN PATENT DOCUMENTS

| CN | 103130337 A | 6/2013 |
| CN | 103464101 A | 12/2013 |
| | (Continued) | |

OTHER PUBLICATIONS

Patent Translate machine translation of CN103464101 (Year: 2013).*
(Continued)

*Primary Examiner* — Janine M Kreck
(74) *Attorney, Agent, or Firm* — Hamre, Schumann, Mueller & Larson, P.C.

(57) ABSTRACT

A method for preparing the iron-based biochar material, the iron-based biochar material prepared there from and a method for controlling the heavy metal pollution in soil using the iron-based biochar material. For the iron-based biochar material of the present invention, by using a method of high-temperature carbonization, a biomass is used as a raw material and an iron-containing compound is add in the process of preparing biochar, wherein iron is incorporated in a specific ratio, to form the iron-based biochar material with a special structure and function. The material has a simple preparation process, low cost and a short production period; the prepared iron-based biochar material has an unique (Continued)

effect on the arsenic-cadmium combined pollution soil remediation, can effectively reduce the bioavailability of arsenic and cadmium in the soil, significantly reduces the arsenic and cadmium contents in the agricultural products planted in the arsenic-cadmium combined pollution soil, and has no toxic and side effects on the crops, is safe to apply and can be applied to the control of arsenic-cadmium combined pollution soil in a large scale.

17 Claims, 7 Drawing Sheets

(51) Int. Cl.
*B01F 3/08* (2006.01)
*C01G 49/14* (2006.01)
*C09K 17/40* (2006.01)

(56) References Cited

FOREIGN PATENT DOCUMENTS

| CN | 103801261 A | 5/2014 |
| WO | 2013126477 A1 | 8/2013 |

OTHER PUBLICATIONS

International Search Report and Written Opinion, International Patent Application No. PCT/CN2014/090307, dated Jul. 9, 2015, with English translation (15 pages).

Zhou et al., "Biochar-supported zerovalent iron for removal of various contaminants from aqueous solutions", Bioresource Technology, vol. 152, Jan. 31, 2014, pp. 538-542, cited in International Search Report.

Jiang et al. "Phosphorus adsorption by and forms in Fe-modified biochar", Journal of Agro-Environment Science, vol. 33, No. 9, Sep. 30, 2014 (Sep. 30, 2014), pp. 1817-1822 with English abstract.

* cited by examiner

IRON-BASED BIOCHAR MATERIAL, PREPARATION THEREFOR AND USE THEREOF IN SOIL POLLUTION CONTROL

TECHNICAL FIELD

The invention relates to the field of soil heavy metal remediation, and in particular to an iron-based biochar material, the preparation therefor and use thereof in soil pollution control.

BACKGROUND TECHNIQUE

In arsenic-cadmium combined pollution soil, about one-sixth of the paddy fields suffer from arsenic-cadmium combined pollution in different degree, and the pollution area is increasing year by year. Mining and smelting is the main way of arsenic-cadmium combined pollution in soil; waste slags and tailing sands usually contain high concentration arsenic and cadmium waste ores or tailing sands; after natural weathering and rain erosion, arsenic and cadmium will be released to soil, so that the soil suffers severe arsenic-cadmium combined pollution. Too high cadmium and arsenic can cause the gradual variation of the soil biological characteristics, resulting in decreased soil quality. Also, arsenic and cadmium in the soil have strong biological migration and toxicity, extremely easily absorbed by crops and accumulated, and directly affects the crop quality and yield. Moreover, they have a serious harm to human health through the food chain. Therefore, how to repair arsenic-cadmium combined pollution soil has become a major problem to be solved.

In recent years, the application of the biochar material in heavy metal pollution remediation gets attention gradually. The biogenic carbon material has a wide range of sources, has a large number of microporous structures and a large specific surface area, strong adsorption capacity, and its adsorption behaviour can affect the migration, transformation, bio-ecological effects of heavy metals in the environment and contaminated environmental media control and repair and other processes. The biochar contains, on the surface, a large number of functional groups, such as carboxyls, hydroxyls, anhydrides, etc., as well as negative charges, and has a larger surface area. After having been applied to the soil, the biochar can adsorb heavy metals and immobilize them on the surface, which can significantly reduce the bioavailability of most heavy metals and improve the physical, chemical and biological properties of the soil, such that soil fertility and crop yield are both improved to some extent.

However, the biochar material can significantly improve the mobility and availability of arsenic in soil. It has been reported that the biochar can reduce the concentration of cadmium and zinc in the soil filtrate (by 300 times and 45 times, respectively), but the concentration of arsenic in the filtrate is obviously improved and the biochar improves the mobility of arsenic. In addition, it was reported that the addition of the biochar could improve the microenvironment of rice rhizosphere and promote the formation of a root surface iron film; as a result, the concentrations of Cd, Zn and Pb in rice roots are decreased by 98%, 83% and 72%, respectively, but the arsenic concentration is increased by 327%. Therefore, how to improve the composition and properties of the biochar and improve the capacity of adsorption and fixation of arsenic thereof, and at the same time to reduce the effectiveness of arsenic and cadmium in the soil is very challenging and also has a great environmental significance.

It has been reported in a number of literatures that the zero-valent iron can reduce the bioavailability of arsenic in the soil, and the zero-valent iron has strong electron transfer and adsorption ability; under the aerobic conditions, the biomineralization and iron oxidation are promoted by the electron transfer, thereby promoting the oxidation of trivalent arsenic and the adsorption fixation of the pentavalent arsenic in the soil; under the anaerobic conditions, the trivalent arsenic may be directly reduced to zero. The bioavailability of arsenic depends on its valence and morphology, and the promotion of the oxidation and adsorption of arsenic in the soil can reduce its effectiveness. Therefore, how to combine the biochar with the environmental effect of zero-valent iron to prepare an iron-based biochar composite material and at the same time reduce the effectiveness of arsenic and cadmium in soil is of great significance.

DISCLOSURE OF INVENTION

In order to solve the above problems, the invention fully utilizes the adsorption and redox properties of the zero-valent iron and the biochar to obtain an iron-based biochar material which can effectively reduce the cadmium-arsenic combined pollution in the soil at the same time, and the material has stable properties and can keep a long-term effectiveness, is conducive to the repair of cadmium and arsenic combined pollution soil.

Accordingly, an aspect of the present invention provides a method for preparing an iron-based biochar material, comprising the steps of:

1. preparing a biochar material: drying in the air and crushing a biomass material, increasing the temperature to 300° C. to 800° C., keeping the temperature for 3 to 12 hours, and stopping heating;

2. preparing a mixture of iron and biochar: adding an iron-containing compound to the biocarbon material prepared in step 1 to obtain a mixture of iron and biochar, wherein the mass percentage of carbon to iron is 9-50:1, stirring and reacting the mixture;

3. activating the biocarbon material: adding a reducing agent solution with a mass percentage of 0.01-10% into the mixture prepared in step 2, and stirring and reacting the mixture for 2-6 hours;

4. preparation of iron-based biochar material: adding an emulsifier solution to the activated biochar material prepared in step 3, stirring and reacting the mixture for 2 to 6 hours at 300 to 800° C., followed by cooling, drying in the air and crushing, to obtain the iron-based biochar material.

In a preferred embodiment of the present invention, the biomass in step 1 is one or more of the roots, stems and leaves of woody plants, preferably palm and chaff.

In a preferred embodiment of the present invention, the heating treatment in step 1 is performed by slowly increasing the temperature to 200° C. and keeping the temperature constant for 2 hours.

In a preferred embodiment of the present invention, the temperature in step 1 is increased to 300° C. at a rate of 5° C./min and maintained for 12 hours or the temperature is increased to 800° C. at a rate of 5° C./min and maintained for 3 hours, more preferably is increased to 500° C. at a rate of 5° C./min and maintained for 9 hours.

In a preferred embodiment of the present invention, the iron-containing compound in step 2 is one or more of inorganic and organic iron-containing compounds, more preferably ferrous sulfate, ferric nitrate, and ferric sulfate.

In a preferred embodiment of the present invention wherein the reducing agent solution in step 3 is sodium borohydride or polyvinylpyrrolidone.

In a preferred embodiment of the present invention, the reducing agent solution in step 3 is a sodium borohydride solution in a mass percentage of 0.01 to 1%, and the reaction is stirred for 2 hours.

In a preferred embodiment of the present invention, the emulsifier solution in step 4 is a Tween series, a Span series or polyvinyl alcohol (PVA).

In a preferred embodiment of the present invention, the reaction is stirred at 300° C. for 6 hours or at 800° C. for 2 hours in step 4.

Another aspect of the present invention provides an iron-based biochar material prepared according to the method of the present invention.

A further aspect of the present invention also provides a method for controlling heavy metal pollution in soil by using the iron-based biochar material of the present invention, comprising the steps of:

1. adding the iron-based biochar material to heavy metal polluted soil in a mass ratio of the iron-based biochar material to the soil of 1:10-1:500,
2. adding water to the controlled soil to flood the soil.

In a preferred embodiment of the present invention, the heavy metal polluted soil is arsenic-cadmium combined pollution soil.

In a preferred embodiment of the present invention, the mass ratio of the iron-based biochar material to the soil is 3:100.

Compared with the existing soil remediation technology, the invention has the following advantages:

1. The present invention fully utilizes the adsorption and redox properties of the biochar material to obtain a biological carbon material which can effectively reduce the cadmium-arsenic combined pollution in the soil at the same time, and the material has stable properties and can keep a long-term effectiveness, is conducive to the repair of cadmium-arsenic combined pollution soil.
2. The iron-based biochar material of the present invention is an environmentally friendly material and a soil component contained in the healthy soil, and the biochar can improve the physical, chemical and biological characteristics the soil, adjust the soil pH value and accelerate the soil microbial metabolism, thereby improving soil fertility. Therefore, there is no secondary pollution to the target soil during application.
3. The present invention has a simple preparation process, a wide raw material source, low production costs, a short production period, and is easy for large-scale production.

Thus, the present invention can be used to reduce the bioavailability of arsenic-cadmium combined pollution in heavy metal polluted soil. At the same time, the soil can also make full use of the capacity of the soil itself to buffer the heavy metal pollution, and by adding an iron-based biochar material, reduces the cadmium arsenic bioavailability in the soil, and reduce the cadmium and arsenic absorption from the soil by crops. Therefore, the iron-based biochar material of the invention has important social and economic significances for heavy metal polluted soil remediation and ecological security.

PARTICULAR EMBODIMENTS

Figure 1:
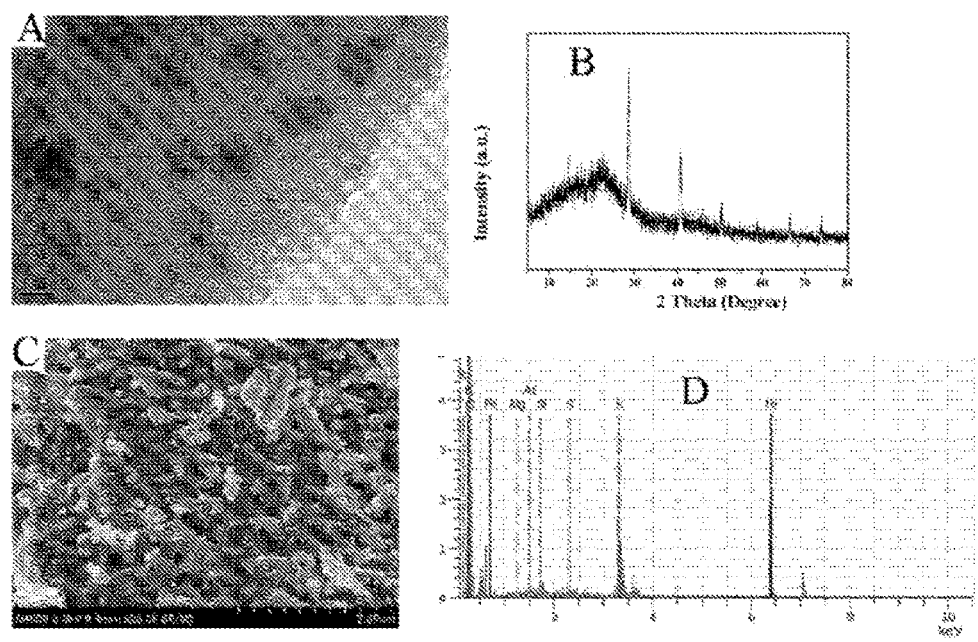
FIG. 1 shows the TEM (A), XRD (B), SEM (C) and EDS (D) characteristic results of an iron-based biochar material.

The invention will now be described in further detail by way of examples, which are intended to illustrate the invention and not to limit the invention. It should be noted that improvements and modifications of the present invention will occur to those skilled in the art without departing from the principles of the present invention, which fall within the scope of the present invention.

Example 1 Preparation of an Iron-Based Biochar Material Sample 1

1. Preparation of the Biochar Material

Palm is dried in the air; 10 kg is weighed, placed in a high-temperature furnace, and slowly heated to 200° C.; the temperature is maintained for 2 hours, and then increased at a rate of 5° C./min; the material is further heated to 800° C. and maintained at that temperature for 3 hours; the heating is stopped and the biochar material is prepared.

2. Preparation of a Mixture of Iron and Biochar 2500 g of a ferrous sulfate solid is weighed and added to the biochar material prepared in Example 1 under agitation to obtain a mixture of iron and biochar in which the mass ratio of carbon to iron is 9:1 and the reaction is stirred for 1 hour.

3. Activation of the Biochar Material 500 g of sodium borohydride is weighed and dissolved in 500 mL of purified water to prepare as a sodium borohydride reducing agent solution having a mass fraction of 1%.

The sodium borohydride reductant solution is added slowly at a rate of 10 mL/min to a high temperature furnace containing the mixture of iron and biochar prepared in step 2; the addition is complete in 1 hour and the reaction was stirred for 2 h.

4. Preparation of Iron-Based Biochar Material 50 g Tween-80 is weighed and homogeneously dissolved in 1000 mL of purified water to prepare a Tween-80 emulsifier solution having a mass percentage of 0.05%.

The above Tween-80 emulsifier solution is slowly added at a rate of 10 mL/min to the high-temperature furnace containing the activated biochar material in step 3, and the addition is completed in 1 hour.

The mixture is heated to 300° C. again, and maintained at this temperature for 6 hours. After the heating has been stopped, then the material is naturally cooled, dried in the air and crushed, to obtain the iron-based biochar material, named as sample 1.

Example 2 Preparation of an Iron-Based Biochar Material Sample 2

1. Preparation of the Biochar Material

Palm is dried in the air; 10 kg is weighed, placed in a high-temperature furnace, and slowly heated to 200° C.; the temperature is maintained for 2 hours, and then increased at a rate of 5° C./min; the material is further heated to 300° C. and maintained at that temperature for 12 hours; the heating is stopped and the biochar material is prepared.

2. Preparation of a Mixture of Iron and Biochar 1250 g of a ferric nitrate solid is weighed and added to the biochar material prepared in step 1 under agitation to obtain a mixture of iron and biochar in which the mass ratio of carbon to iron is 9:1 and the reaction is stirred for 1 hour.

3. Activation of the Biochar Material 50 g of sodium borohydride is weighed and dissolved in 250 mL of purified water to prepare as a sodium borohydride reducing agent solution having a mass fraction of 0.2%.

The sodium borohydride reductant solution is added slowly at a rate of 10 mL/min to a high temperature furnace containing the mixture of iron and biochar prepared in step 2; the addition is complete in 1 hour and the reaction was stirred for 2 h.

4. Preparation of Iron-Based Biochar Material 50 g Tween-80 is weighed and homogeneously dissolved in 1000 mL of purified water to prepare a Tween-80 emulsifier solution having a mass percentage of 0.05%.

The above Tween-80 emulsifier solution is slowly added at a rate of 10 mL/min to the high-temperature furnace containing the activated biochar material in step 3, and the addition is completed in 1 hour.

The mixture is heated to 300° C. again, and maintained at this temperature for 6 hours. After the heating has been stopped, then the material is naturally cooled, dried in the air and crushed, to obtain the iron-based biochar material, named as sample 2.

Example 3 Preparation of an Iron-Based Biochar Material Sample 3

1. Preparation of the Biochar Material

Chaff is dried in the air; 10 kg is weighed, placed in a high-temperature furnace, and slowly heated to 200° C.; the temperature is maintained for 2 hours, and then increased at a rate of 5° C./min; the material is further heated to 500° C. and maintained at that temperature for 9 hours; the heating is stopped and the biochar material is prepared. 2. Preparation of a Mixture of Iron and Biochar 250 g of a ferric sulfate solid is weighed and added to the biochar material prepared in step 1 under agitation to obtain a mixture of iron and biochar in which the mass ratio of carbon to iron is 50:1 and the reaction is stirred for 1 hour.

3. Activation of the Biochar Material 5 g of sodium borohydride is weighed and dissolved in 500 mL of purified water to prepare as a sodium borohydride reducing agent solution having a mass fraction of 0.01%.

The sodium borohydride reductant solution is added slowly at a rate of 10 mL/min to a high temperature furnace containing the mixture of iron and biochar prepared in step 2; the addition is complete in 1 hour and the reaction was stirred for 2 h.

4. Preparation of Iron-Based Biochar Material 50 g Tween-80 is weighed and homogeneously dissolved in 1000 mL of purified water to prepare a Tween-80 emulsifier solution having a mass percentage of 0.05%.

The above Tween-80 emulsifier solution is slowly added at a rate of 10 mL/min to the high-temperature furnace containing the activated biochar material in step 3, and the addition is completed in 1 hour.

The mixture is heated to 800° C. again, and maintained at this temperature for 2 hours. After the heating has been stopped, then the material is naturally cooled, dried in the air and crushed, to obtain the iron-based biochar material, named as sample 3.

Example 4. Characterization and Analysis of Iron-Based Biochar Material

The sample 2 obtained above is characterized on an XRD instrument; the characterization parameters are: an MSAL-XD2 fully automatic X-ray powder diffractometer (a. Cu target of 40 kV, 30 mA, 1.54051 Å, a scanning range of 5 to 80°).

The diluted material is added dropwise on a copper mesh containing a carbon film, dried at room temperature, and observed by a Philips TECNAI-10 projection electron microscope (an accelerating voltage of 100 kV).

The sample is placed on a conductive adhesive, the morphology and structure of the samples are observed by a Zeiss field emission scanning electron microscopy, and the sample 2 is analysed by X-ray photoelectron spectroscopy (XPS).

From the results of the X-ray diffraction (XRD), transmission electron microscopy (TEM) and scanning electron microscopy (SEM), it is found that iron-based biochar material contains large pores and the iron particles are loaded on the biochar material, with a size of about 20 nm. From the XPS results, it can be seen that the obtained material contains carbon and zero valent iron, and the iron-based biochar material contains elements such as potassium and magnesium which are necessary for promoting crop growth, See FIG. 1 for details.

Figure 2:
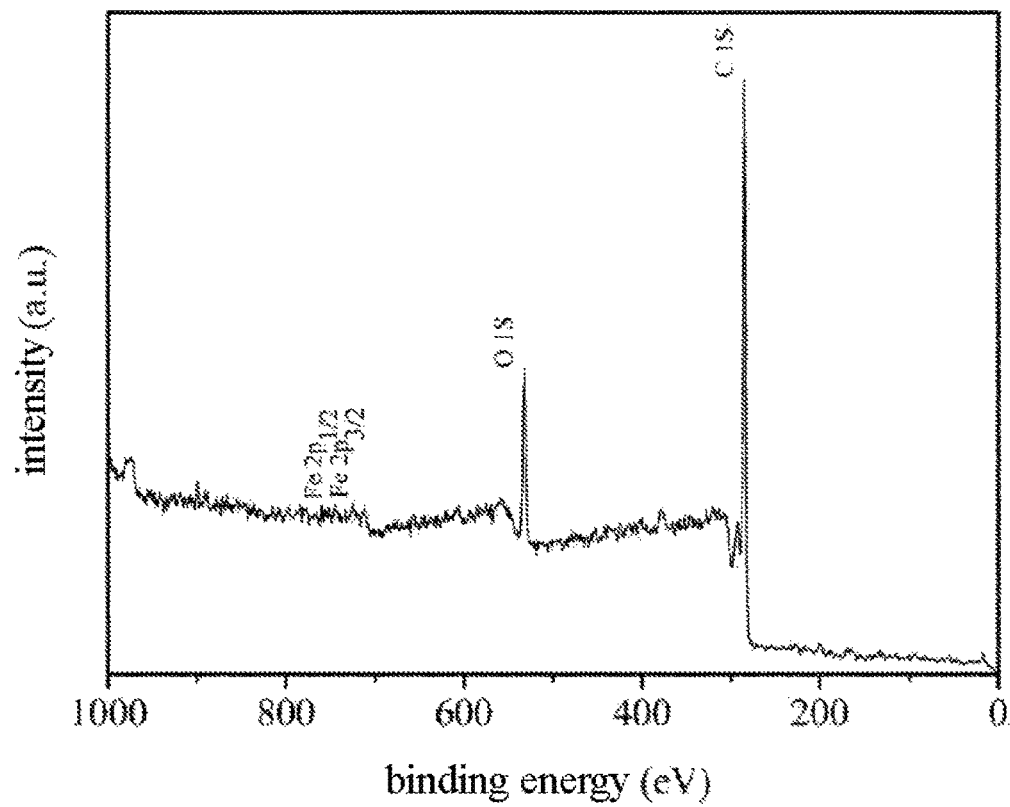
FIG. 2 shows an XPS full spectrum of an iron-based biochar material.

The contents of carbon, iron, and other elements in sample 1-3 are shown in Table 1 below The XPS full spectrum of the iron-based biochar material is shown in FIG. 2.

TABLE 1

Analysis results of elemental contents of iron-based biochar material

| Name | C (wt. %) | Fe (wt. %) | K | Other elements |
|---|---|---|---|---|
| Sample 1 | 83.64 | 4.67 | 1.46 | 10.23 |
| Sample 2 | 89.77 | 2.16 | 1.24 | 6.83 |
| Sample 3 | 90.12 | 0.45 | 1.32 | 8.11 |

Example 5 Analysis of Polycyclic Aromatic Hydrocarbon Compound Content in Iron-Based Biochar Material The polycyclic aromatic hydrocarbon contents (PAHs) in the iron-based biochar material (Example 2) is analysed, and the results showed that the contents of the 16 compounds are low, and the results are shown in Table 2. PAHs are volatile hydrocarbons produced when materials are incompletely burned and are important environmental pollutants. The total contents of PAHs in biochar and iron-based biochar materials are 35 μg/kg and 32.62 μg/kg, respectively; the content of PAHs in the iron-based biochar material is extremely low. Therefore, the use of the iron-based biochar materials in heavy metal polluted soil will not produce secondary pollution.

TABLE 2 analysis results of polycyclic aromatic hydrocarbon content in iron-based biochar and biochar

| Name | Biological carbon material | Iron-based biochar material |
|---|---|---|
| Naphthalene (μg/kg) | 21.23 | 20.12 |
| Acenaphthylene (μg/kg) | 0.38 | 0.34 |
| Acenaphthene (μg/kg) | 7.07 | 1.85 |
| Fluorene (μg/kg) | 4.91 | 4.20 |
| Phenanthrene (μg/kg) | 0.37 | 0.35 |
| Anthracene (μg/kg) | 0.04 | 0.02 |
| Fluoranthene (μg/kg) | 0.13 | 0.11 |
| Pyrene (μg/kg) | 0.13 | 0.14 |
| Benzo(a)anthracene (μg/kg) | 0.10 | 0.10 |
| Chrysene(Mg/kg) | 0.08 | 0.05 |
| Benzo(b)fluoranthene (μg/kg) | 4.01 | 3.85 |
| Benzo(k)fluoranthene (μg/kg) | 0.95 | 0.90 |
| Benzo(a)pyrene (μg/kg) | 0.37 | 0.38 |
| Indeno(1,2,3-cd)pyrene (μg/kg) | 0.08 | 0.05 |
| Benzo(a, h)anthracene (μg/kg) | 0.07 | 0.06 |
| Benzo(g, h, i)pyrene (μg/kg) | 0.13 | 0.10 |
| Total content (μg/kg) | 35 | 32.62 |

Example 6 Test of Adsorption of Trivalent Arsenic and Pentavalent Arsenic by Iron-Based Biochar Material 0.02 g of the iron-based biochar material (Example 2) is weighed into a 20 mL vial, and 1 mL of a 0.1 mol/L NaCl solution is added to the vial; a different volume of As (III) or As (V) solution is measured, and ultra-pure water of pH=7 is added to a volume of 10 mL. The vial is closed and placed in a thermostatic shaker (25° C., 200 rmp/min) and shaken and uniformly mixed for 5 min, 10 min, 20 min, 0.5 h, 1 h, 1.5 h, 2 h, 3 h, 4 h and 6 h, respectively; the As(III) or As (V) content in the test solution is measured.

Figure 3:
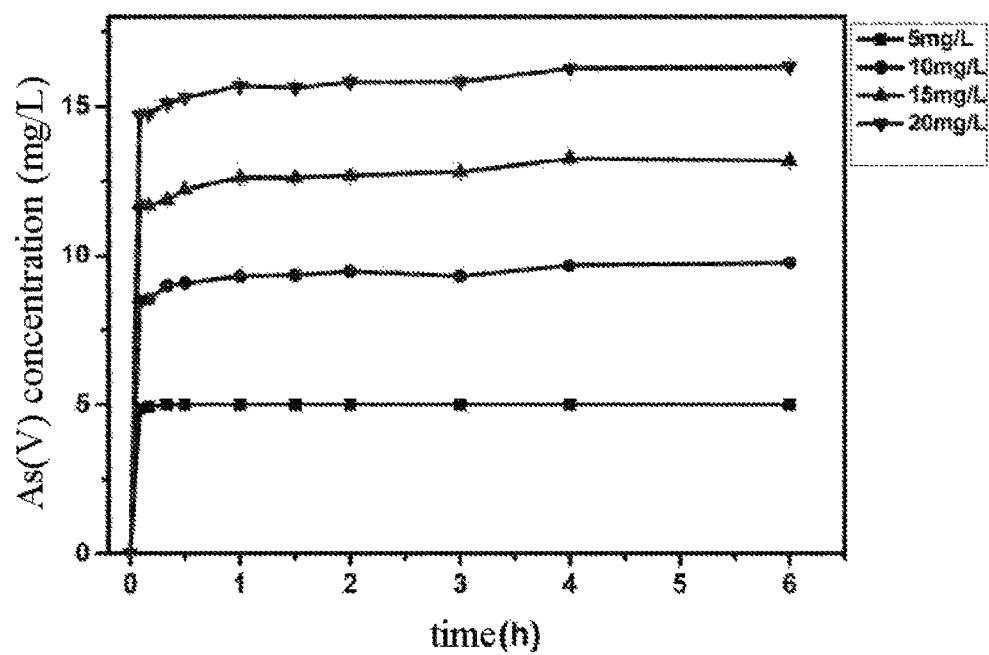
FIG. 3 is a graph of the adsorption kinetics of pentavalent arsenic on an iron-based biochar material.
Figure 4:
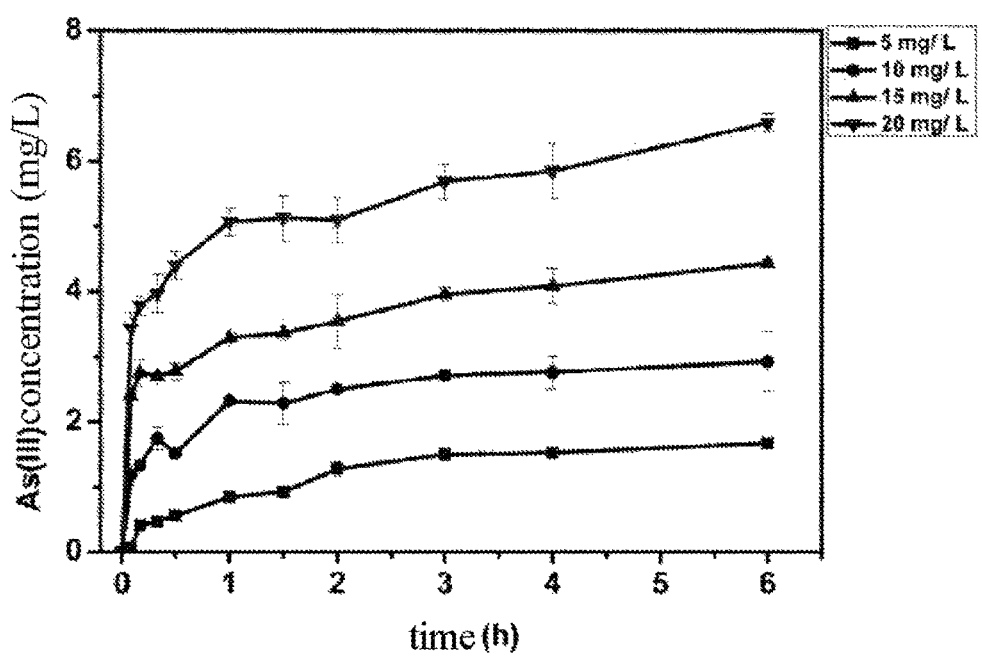
FIG. 4 is a graph of the adsorption kinetics of trivalent arsenic with iron-based biochar material.

The results are as shown in FIGS. 3 and 4, after a treatment for 30 min, the adsorption of As (V) on iron-based biochar material of a concentration of 5, 10, 15 and 20 mg/L respectively, is 5, 7.8, 11.3 and 15.2 ma, respectively. After a treatment for 5 min, the adsorption of As (III) on iron-based biochar material of a concentration of 5, 10, 15 and 20 mg/L respectively, is 1, 1.5, 2.8 and 4.6 mg, respectively. Therefore, the iron-based biochar has faster nd strong adsorption capacity for arsenic.

Example 7. Application of Iron-Based Biochar Material in the Control of Arsenic-Cadmium Combined Pollution Soil The soil sample is collected from the arsenic-cadmium-combined pollution rice soil in Renhua county, Shaoguan city, Guangdong province, China; the soil is treated with biochar and iron-based biochar material at a mass ratio of 3:100, respectively; as a control, paddy soil without biochar material or iron-based biochar material is used, with three replicates per treatment. After the soil is mixed uniformly, emerge-germinating rice seeds are transplanted in culture pots and placed under constant light; the day and night temperatures are controlled at 24 and 20° C., respectively, and a 1 cm of a flooding layer is collected; the various rice samples are collected and the change of the contents of arsenic and cadmium in rice is analysed.

Figure 5:
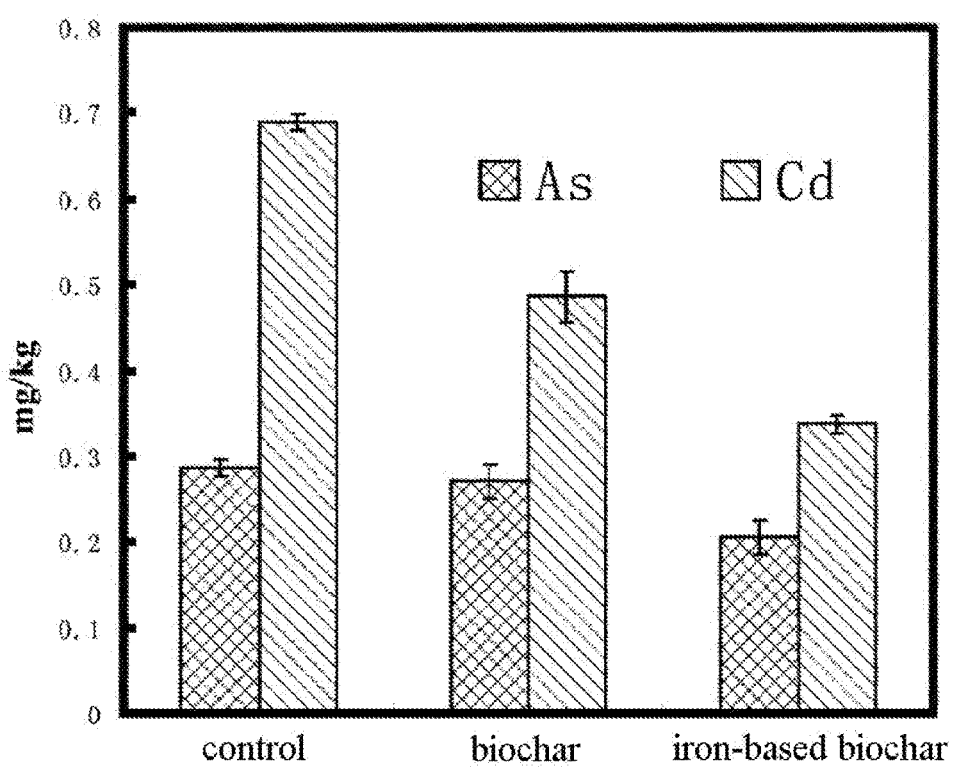
FIG. 5 shows the changes of arsenic and cadmium contents in rice grains before and after the heavy metal polluted soil has been treated with iron-based biochar material.

It can be seen from the test results showed that when the iron-based biochar material is applied to the heavy metal polluted paddy field, the contents of cadmium and arsenic in the rice are decreased by 51.1% and 21.4%, respectively, compared with the control, as shown in FIG. 5.

Example 8. Application I of Iron-Based Biochar Material in the Remediation of Arsenic-Cadmium Combined Pollution Soil and the Safe Production of Agricultural Products The soil samples are collected from arsenic-cadmium polluted paddy soil of in Fogang county, Guangdong province, China; the soil and iron-based biochar materials are treated at a mass ratio of 3:100, and the control group is rice soil without iron-based biochar material, wherein each plot is 20 m², and three replicates were set for each treatment; the rice is planted, the pH and, available cadmium and available arsenic in the soil are analysed, and the treated rice samples are collected for the analysis of arsenic and cadmium contents in rice. The results are shown in Table 3.

TABLE 3

Effect of iron-based biochar on cadmium, arsenic and other parameters in heavy metal polluted soil

| Criterion | CK | Iron-based biochar treatment |
|---|---|---|
| pH value | 4.66 ± 0.09 | 4.79 ± 0.08 |
| Available arsenic content in soil (mg/kg) | 2.96 ± 0.17 | 2.29 ± 0.12 |
| Arsenic content in rice (mg/kg) | 0.28 ± 0.02 | 0.20 ± 0.01 |
| Available cadmium content in soil (mg/kg) | 1.56 ± 0.06 | 1.33 ± +0.02 |
| Rice cadmium content (mg/kg) | 0.68 ± 0.07 | 0.33 ± 0.12 |

It can be seen from the experimental results that after the iron-based biochar material has been applied to the heavy metal polluted paddy field, the pH value of the soil increased to some extent and the available cadmium and arsenic in the soil decreased by 14.7% and 19.2%, respectively and the contents of cadmium and arsenic in rice decreased by 51.5% and 28.6%, respectively. Therefore, after the iron-based biochar material obtained by the present invention has been applied to the soil, the iron-based biochar material can effectively reduce the contents of available arsenic and cadmium in the soil and greatly reduce the contents of arsenic and cadmium in the planted rice.

Example 9. Application II of Iron-Based Biochar Material in the Remediation of Arsenic-Cadmium Combined Pollution Soil and the Safe Production of Agricultural Products The test soil was collected from the arsenic-cadmium combined pollution soil in the Hegangting base, Baiyun district, Guangdong province, China (the contents of available arsenic and cadmium are shown in Table 4).

TABLE 4

Analysis of available cadmium and arsenic concentrations in soil

| PH value | Available arsenic content in soil (mg/kg) | Available cadmium content in soil (mg/kg) |
|---|---|---|
| 4.76 ± 0.06 | 0.54 ± 0.09 | 0.42 ± 0.08 |

Figure 6:
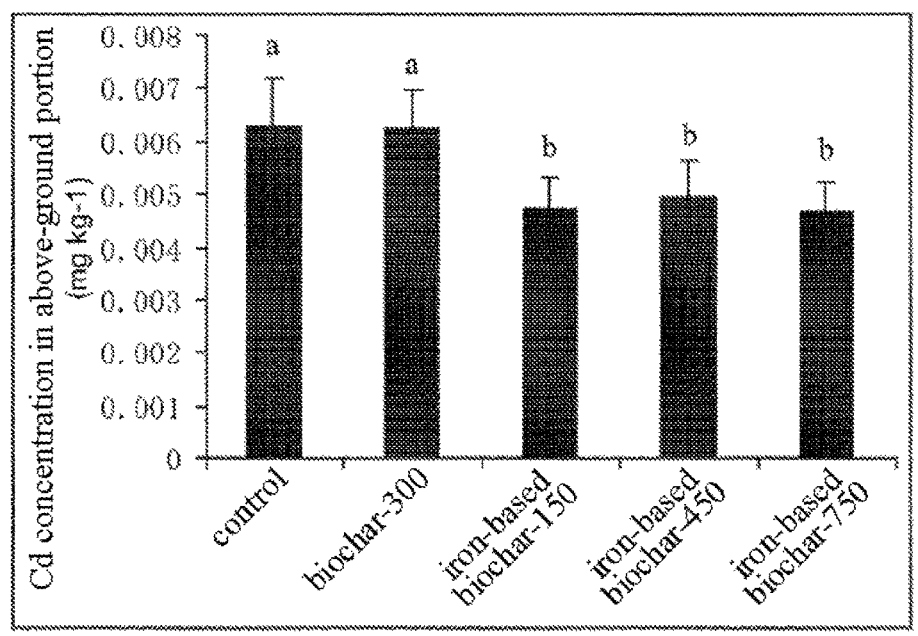
FIG. 6 shows the changes of the available cadmium content in lettuce before and after the heavy metal polluted soil has been treated with iron-based biochar materials of different iron contents.
Figure 7:
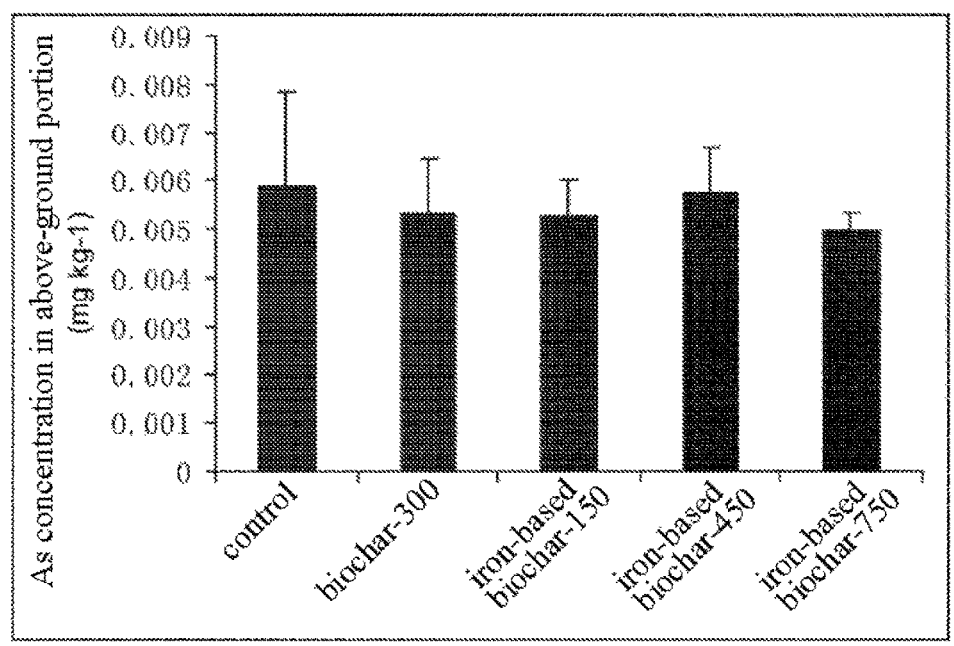
FIG. 7 shows the changes of the available arsenic content in lettuce before and after the heavy metal polluted soil has been treated with iron-based biochar materials of different iron contents.

The soil is treated with biochar and iron-based biochar with different iron contents (5%, 2.5%, 1%) in a mass ratio of 100:3, the control group is rice soil without iron-based biochar, wherein each plot is 20 m², three replicates are set for each treatment; lettuce is planted, lettuce samples are collected from each treatment, and the change of arsenic and cadmium content in the lettuce is analysed. The results are shown in FIGS. 6 and 7.

From the experimental results, it can be seen that the iron-based biochar was applied for the arsenic-cadmium complex contaminated soil, the content of arsenic and cadmium in lettuce are decreased to some extent, wherein the decrease of Cd concentration in lettuce is greater than that of arsenic, and the concentrations of arsenic and cadmium in lettuce decreases with the increase of the iron content. After treatment with the iron-based biochar material 5%, 2.5% and 1%, respectively, the cadmium concentrations in lettuce are reduced by 23.8%, 19.1% and 24.2%, and the arsenic concentration are reduced by 10.5%, 7.84% and 14.8%. Compared with the conventional biochar, the application of the iron-based biochar material reduces the content of arsenic and cadmium in lettuce in a larger degree.

The invention claimed is:

1. A process for preparing an iron-based biochar material, comprising:
   (1) preparing a biochar material including drying in the air and crushing a biomass material to obtain a crushed biomass material, heating the crushed biomass material to a temperature of 300° C. to 800° C. and keeping the temperature for 3 to 12 hours for a heat treatment, and stopping heating;
   (2) preparing a mixture of an iron-containing compound and biochar material including adding an iron-containing compound to the biochar material prepared in step (1) to obtain a mixture of the iron-containing compound and the biochar material, wherein the mass percentage of carbon to iron is 9-50:1, stirring and reacting the mixture;
   (3) activating the biochar material to obtain an activated biochar material including adding a reducing agent solution with a mass percentage of 0.01-10% into the mixture prepared in step (2), and stirring and reacting the mixture for 2-6 hours;
   (4) preparation of an iron-based biochar material including adding an emulsifier solution to the activated biochar material prepared in step (3), stirring and reacting the mixture for 2 to 6 hours at 300 to 800° C., followed by cooling, drying in the air and crushing, to obtain the iron-based biochar material.

2. The process for preparing an iron-based biochar material according to claim 1, wherein the biomass material in step (1) is one or more of the roots, stems and leaves of woody plants.

3. The process for preparing an iron-based biochar material according to claim 1, wherein the heat treatment in step (1) is performed by slowly increasing the temperature to 200° C. and keeping the temperature constant for 2 hours.

4. The process for preparing an iron-based biochar material according to claim 1, wherein the temperature in step (1) is increased to 300° C. at a rate of 5° C./min and maintained for 12 hours or the temperature is increased to 800° C. at a rate of 5° C./min and maintained for 3 hours.

5. The process for preparing an iron-based biochar material according to claim 1, wherein the iron-containing compound in the step (2) is one or more of inorganic and organic iron-containing compounds.

6. The process for preparing an iron-based biochar material according to claim 1, wherein the reducing agent solution in step (3) is sodium borohydride or polyvinylpyrrolidone.

7. The process for preparing an iron-based biochar material according to claim 1, wherein the reducing agent solution in step (3) is a sodium borohydride solution in a mass percentage of 0.01 to 1%, and the reaction is stirred for 2 hours.

8. The process for preparing an iron-based biochar material according to claim 1, wherein the emulsifier solution in step (4) is a polyoxyethylene sorbitan monooleate, or polyvinyl alcohol (PVA).

9. The process for preparing an iron-based biochar material according to claim 1, wherein the stirring and reacting in step (4) is conducted at 300° C. for 6 hours or at 800° C. for 2 hours.

10. An iron-based biochar material prepared by the process according to claim 1, wherein the iron-based biochar material contains 0.45-4.67% of iron.

11. The iron-based biochar material of claim 10, wherein 0.02 g of the iron-based biochar material removes 15.2 mg of As(V) from an aqueous solution containing 20 mg/L of As(V) in 30 minutes.

12. The method for preparing an iron-based biochar material according to claim 1, wherein the biomass material in step (1) is one or more of palm and chaff.

13. The method for preparing an iron-based biochar material according to claim 1, wherein the temperature in step (1) is increased to 500° C. at a rate of 5° C./min and maintained for 9 hours.

14. The process for preparing an iron-based biochar material according to claim 1, wherein the iron-containing compound in the step (2) is one or more of ferrous sulfate, ferric nitrate, and iron sulfate.

15. A method for controlling heavy metal pollution in soil by using the iron-based biochar material according to claim 10, comprising the steps of:
   (1) adding the iron-based biochar material to heavy metal polluted soil in a mass ratio of the iron-based biochar material to the soil of 1: 10-1:500,
   (2) adding water to the controlled soil to flood the soil.

16. The method for controlling heavy metal pollution in soil according to claim 15, wherein said heavy metal polluted soil is arsenic-cadmium combined pollution soil.

17. The method for controlling heavy metal pollution in soil according to claim 15, wherein the mass ratio of the iron-based biochar material to the soil is 3:100.

* * * * *